United States Patent [19]
Fukemoto

[11] Patent Number: 4,514,927
[45] Date of Patent: May 7, 1985

[54] FISHING LINE WITH A REINFORCED LEADER

[76] Inventor: Hiromu Fukemoto, 953-9, Kushimoto, Kushimoto-cho, Nishimuro-gun, Wakayama, Japan

[21] Appl. No.: 555,631

[22] Filed: Nov. 25, 1983

[30] Foreign Application Priority Data

Nov. 27, 1982 [JP] Japan ................. 57-208336

[51] Int. Cl.³ .............................. A01K 91/00
[52] U.S. Cl. ................... 43/44.98; 43/43.1; 43/44.88
[58] Field of Search ............ 43/44.88, 44.98, 44.87, 43/44.92, 43.1

[56] References Cited

U.S. PATENT DOCUMENTS 1,614,642  1/1927  Babbitt ..................... 43/44.98

FOREIGN PATENT DOCUMENTS 2651736  5/1978  Fed. Rep. of Germany ..... 43/44.87

Primary Examiner—Gene P. Crosby
Attorney, Agent, or Firm—Wenderoth, Lind & Ponack

[57] ABSTRACT

A fishing line with a leader reinforced by a rod which slides over and toward the leader when a big fish takes the hook. It is normally stopped in its inoperative position by a bent wire.

2 Claims, 7 Drawing Figures

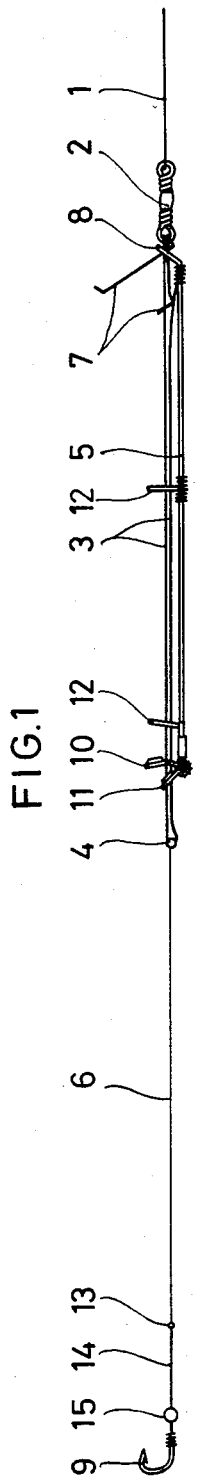
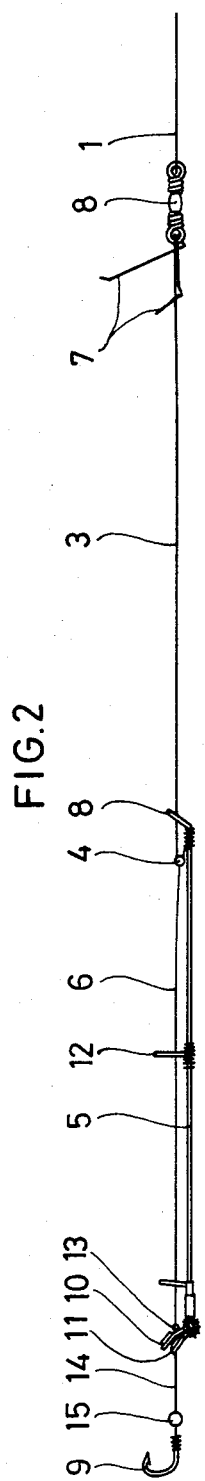
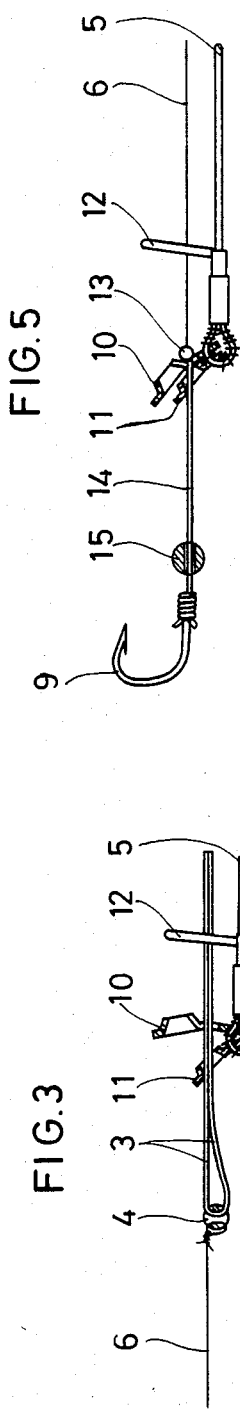
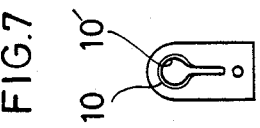
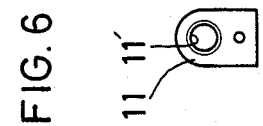
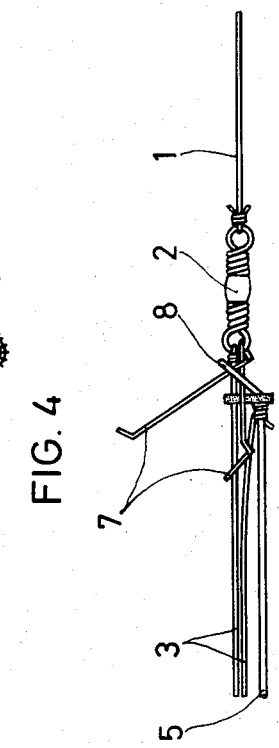

FISHING LINE WITH A REINFORCED LEADER

BACKGROUND OF THE INVENTION

The present invention relates to a fishing line with a reinforced leader.

Generally, a very thin line or thread is used as a leader or snell near the hook for greater fishing effect. Therefore, when a big fish takes the hook and pulls the fishing line, the leader sometimes breaks under the weight of the fish, losing the fish.

SUMMARY OF THE INVENTION

An object of the present invention is to provide a fish line which has a thin but reinforced leader.

In accordance with the present invention, there is provided a fishing line which has a reinforcing rod adapted to move toward the leader and reinforce it when a fish takes the hook and pulls the fishing line.

Other objects and advantages of the present invention will become apparent from the following description taken with reference to the accompanying drawings.

BRIEF DESCRIPTION OF THE DRAWINGS

FIG. 1 is a front view of a preferred embodiment with the reinforcing rod in its inoperative position;

FIG. 2 is a similar view but with the reinforcing rod in its operative position along the leader;

FIG. 3 is an enlarged view of the central portion of FIG. 1;

FIG. 4 is an enlarged view of the righthand portion of FIG. 1;

FIG. 5 is an enlarged view of the lefthand portion of FIG. 2;

FIG. 6 is a side view of the smaller line guide plate; and

FIG. 7 is a side view of the larger line guide plate.

DETAILED DESCRIPTION OF THE EMBODIMENT

Referring to FIG. 1, the end of a fishing line 1 is attached to one end of a swivel 2, to the other end of which one end of a guide line 3 is attached. The guide line passes through a small ball 4 with a hole (FIG. 3) and its other end is attached to a righthand end of a reinforcing rod 5. One end of a leader 6 is attached to the small ball 4. A stopper 7 comprising a bent wire is attached to the other end of the swivel 2. A ring 8 is formed at the righthand end of the reinforcing rod 5. Two legs of the stopper 7 extend through the ring 8 to temporarily stop the reinforcing rod 5 from sliding leftwardly toward a hook 9.

Two small plates 10, 11 with a hole formed therein are loosely mounted on a ring formed at the other end of the reinforcing rod 5 (FIG. 3). The guide line 3 passes twice through the hole in the two line guide plates 10, 11. One of the plates is slightly larger than the other. The small plate 11 is formed with a round hole 11' (FIG. 6) and the larger plate 10 is formed with a hole 10' like a keyhole (FIG. 7). The guide line 3 having one end attached to the swivel 2 passes through the ring 8 at one end of the reinforcing rod 5, through guide rings 12, through two plates 10, 11, through the small ball 4, again through the two plates 10, 11, again through the guide rings 12, and is attached to the ring 8 at one end of the reinforcing rod 5. The small ball 4 serves as a pulley. (FIG. 3).

The forward end of the leader 1 is connected through a second small ball 13 and a thicker line 14 to the hook 9. The thicker line 14 passes through a third small ball 15 with a hole. (FIG. 1).

In operation, the fishing line according to the present invention is firstly set as shown in FIG. 1. When a fish takes the hook 9, the leader 6 and the guide line 3 is pulled leftwardly in FIG. 1. If the pulling force is sufficiently large, the ring 8 will come off the stopper 7. Now, the reinforcing rod 5 is free to move leftwardly toward the hook 9. The guide line 3, which folds in two in the original state, extends until it becomes straight. When the rod 5 moves toward the hook, the small ball 4 passes through the hole in two plates 10, 11. The reinforcing rod 5 moves leftwardly until its lefthand end comes to near the thicker line 14, as shown in FIG. 2. Now, the reinforcing rod 5 extends along the leader 6 to serve to reinforce it. The rod prevents the leader from breaking under the weight of the fish. After the small ball 13 has passed through the holes in the two plates 10, 11, it abuts on the larger plate 10 at the narrowed portion of the hole 10', preventing the reinforcing rod 5 from coming back rightwardly to the original state even if it is pulled rightwardly. (FIG. 5) In the state shown in FIG. 1, the two plates 10, 11 tilt slightly rightwardly to allow the small ball 4 to pass through them. In the state of FIG. 2, they tilt slightly leftwardly under the pulling force not to allow the small ball 13 to pass through them. These plates are slightly tapered so that the line will not be cut due to rubbing on the edge of the hole in them. (FIG. 5)

The stopper means 7 may be replaced with any other suitable means which can stop the reinforcing rod 5 temporarily from sliding toward the hook.

The reinforcing rod 5 may be adapted to fold into two or more sections for easy carrying. By making it foldable into many short sections, it can also serve as a weight.

If the reinforcing rod is made to be foldable, it may be adapted to spread only when a big fish takes the hook, by using a thread slightly weaker than the leader to bind the sections together. The thread breaks to allow the sections to spread only when a big fish takes the hook, and does not break when a small fish takes it. This arrangement saves trouble for resetting the fishing line each time a small fish takes.

An auxiliary hook may be attached to the larger plate at a suitable position.

What I claim:

1. A fishing line assembly having a fishing line, a hook, a leader connected between said fishing line and said hook, a reinforcing rod for reinforcing said leader when a big fish has taken the hook, a ring member for connecting said fishing line to said leader, said fishing line having one end passing through said ring member and attached to one end of said reinforcing rod remote from said hook, a stopper means attached to said fishing line for stopping temporarily said reinforcing rod in its inoperative position from moving toward the hooks, said reinforcing rod being adapted to become free from said stopper means and move to its operative position when it is pulled with a sufficient force, and return preventing means for preventing said reinforcing rod from returning from its operative position along said leader to its inoperative position.

2. The fishing line assembly as claimed in claim 1, wherein said return preventing means comprise two plates loosely mounted on said reinforcing rod at its end near to the hook, one of said plate nearer to the hook being formed with a hole and the other being formed with a hole like a keyhole, and a small ball mounted on said leader at a point near the hook and being of such a size as to pass through said hole in said plates but not through a narrowed portion in said keyhole-like hole.

* * * * *